L. BECKER.
SEXTANT AND THE LIKE.
APPLICATION FILED MAR. 18, 1912.
1,041,575.
Patented Oct. 15, 1912.
2 SHEETS—SHEET 1.
FIG: 1.
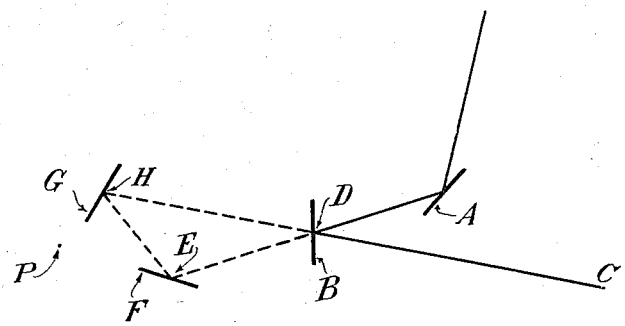
FIG: 2.
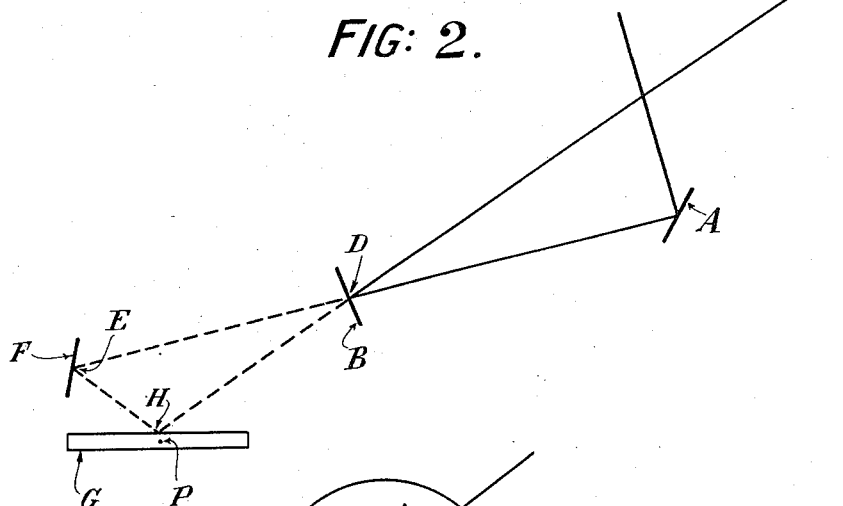
FIG: 9.
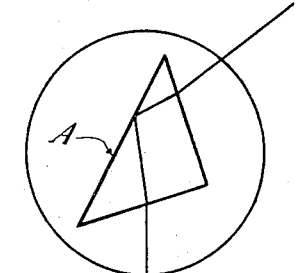
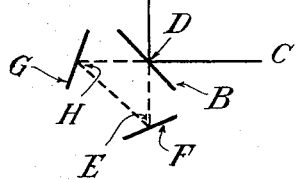
Witnesses.
G. Manning
H. G. Rueth
Inventor.
Ludwig Becker.
By J. Walter Fowler
atty.

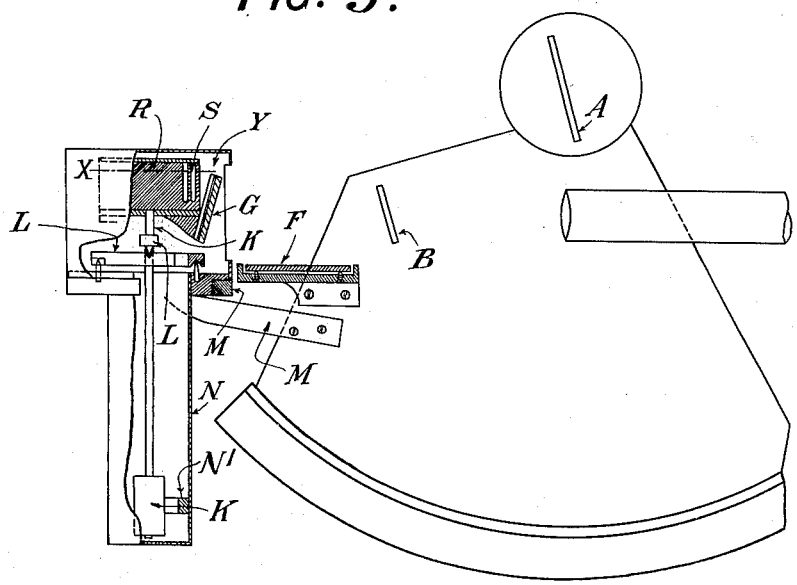

UNITED STATES PATENT OFFICE.

LUDWIG BECKER, OF GLASGOW, SCOTLAND.

SEXTANT AND THE LIKE.

1,041,575.	Specification of Letters Patent.	Patented Oct. 15, 1912.

Application filed March 18, 1912. Serial No. 684,460.

*To all whom it may concern:*

Be it known that I, LUDWIG BECKER, Ph. D., a subject of the King of Great Britain and Ireland, of the Observatory, Glasgow, Scotland, have invented new and useful Improvements in or Connected with Sextants and the Like, (for which I have made applications for patents in Great Britain, No. 7,364, bearing date of March 24, 1911, and Germany, Serial No. 63,938, filed July 24, 1911,) of which the following is a specification.

This invention refers to sextants and instruments of the same type, in which the index glass, mirror or prism (A), reflects light toward the horizon glass, mirror or prism (B), and relates to a new or improved method of and to improvements in or connected with means for indicating when the instrument is supported in the correct position for taking observations, particularly adapted for use under conditions when the horizon is not visible.

According to this invention an auxiliary image of the object which is under observation is produced and in operating the instrument is brought into coincidence with the principal image of the object, the coincidence indicating that the line of sight is at a constant inclination to the horizon and the plane of the sextant lies in a vertical plane.

In describing this invention reference will be made to the accompanying drawings, in which—

Figure 1 is a diagram indicating one system and arrangement of parts according to this invention, and Fig. 2 is a modification thereof. Fig. 3 is a side elevation of a sextant fitted according to the system to be described with reference to Fig. 1, Fig. 4 is a front elevation of a part shown in Fig. 3, each partly in section, and Fig. 5 is a cross sectional plan of a part taken about the line X Y of Fig. 3. Figs. 6 and 7 are each cross sectional views similar to Fig. 5, showing modifications thereof. Fig. 8 is a sectional elevation of a modification relating to a part to be described with reference to Figs. 3 and 4. Fig. 9 shows an application of the invention to a modified form of sextant.

In the diagrams, A designates the index glass, B the horizon glass and C D the line of sight, all as commonly arranged in an ordinary sextant.

In an ordinary sextant a beam of light coming from the object on which the observation is to be made, is reflected by the index glass A and a portion of it is reflected by the horizon glass B and forms an image in the field viewed by the user, while another portion of the beam passes through or past the horizon glass B and is unused; and it is the object of the invention to reflect the latter portion of the beam toward the user so as to form an auxiliary image to be brought into coincidence with the principal image in the field of view when the instrument is in its correct position for taking the observation.

In the system according to this invention the portion of the beam designated D E is reflected in the direction of the line of sight D C by two mirrors F and G, the mirror F being fixed in the path of the central ray A D E and the mirror G placed at the intersection of the line of sight C D with the central ray E H, the reflection of A D E by F.

Assuming that the sextant is fixed in any position convenient for the use of the user, and that the index glass A is turned until the principal image of the object is seen in the field of view and that the mirrors F and G are fixed after being adjusted so that an auxiliary image of the object coincides with the principal image in the field of view, the normals of the mirrors being in the plane of the sextant, there will then always be two coinciding images of the object when at any position of the index glass the ordinary sextant presents only one image. Let the mirror G when it is released from its clamped position, be supported by the sextant in such a manner that the normal to the mirror G is placed by gravity in a vertical plane passing through a point P fixed with reference to the sextant, and let the mirror G be prevented from turning around a line joining P and the centroid of mirror G and its mounting. If now the mirror G be released and the sextant plane together with the mirrors A B F be turned into the vertical plane just defined, then only in this plane and only when the line of sight C D is at the inclination to mirror G to which it was adjusted with mirror G fixed, there will be two coinciding images of an object when the ordinary sextant presents only one. Hence coincidence of the images indicates that the elevation of the object is measured in a vertical plane above a line whose inclination to the horizon is a constant, and the altitude of the object above the horizon equals the reading of the sextant's circle plus a constant index error, which differs from the index error of an ordinary sextant by the angle of inclination of the line of sight.

In the arrangement indicated in Fig. 1, the mirror G is inclined to the horizon and in the arrangement shown in Fig. 2 the mirror G lies in the horizon.

It will be observed that a general movement of the instrument around a horizontal axis will not disturb the coincidence of the images when it is once established, since in both systems of mirrors A B and A F, the mirrors are fixed relatively to each other and the mirror G does not change its position with reference to the incident beam of light.

One method of maintaining the mirror G at a constant inclination to the horizon, is to mount it upon a pendulum in such a manner that the normal to the mirror lies in the plane of the sextant when the latter is vertical. For example, as shown with reference to Figs. 3, 4 and 5, the mirror G may be mounted upon a pendulum K, hung in gimbals L, mounted upon a bracket M attached to the frame of the instrument, and for protection against disturbance the pendulum may be surrounded by a tubular casing N. In order to damp the oscillations of the pendulum K, a vessel R formed with one or more horizontally arranged annular channels S partially filled with liquid, mercury for example, may be mounted upon the pendulum K above its fulcrum; or, as shown at Fig. 6, the vessel R may have a single channel $S^1$ of incomplete annular form, the channel being broken by a partition T; or, as shown at Fig. 7, two such channels $S^2$ $S^3$ may be provided, each having a partition T.

Another method consists in restricting the amplitude of oscillation of the pendulum by means of a ring $N^1$ fixed in the base of the casing shown at Fig. 3, and furnishing, as shown at Fig. 8, the pendulum K with a vessel $K^1$ at its lower end which is partly filled with mercury. Further, the pendulum may be furnished at its lower end with a vessel such as $K^1$, and above its fulcrum with a vessel such as R.

A method which may be adopted to maintain the mirror G in a horizontal position is to float the mirror on a surface of mercury, or to employ as a mirror the surface of a bath of mercury.

With instruments constructed according to this invention altitudes from 0 to 90°, or even altitudes extending to 35° beyond the zenith may be efficiently measured, the line of sight may be horizontal or otherwise directed for the convenient use by the user, and an instrument fitted according to this invention is capable of being used as an ordinary sextant by merely removing the mirror G.

This invention is also adapted to be used in conjunction with a modified form of sextant as shown at Fig. 9, in which an index glass (A) consisting of a rectangular prism is provided and placed vertically above the horizon glass (B).

In the claims, the index glass, mirror or prism (A) and the horizon glass, mirror or prism (B) will generally be termed the index glass (A) and the horizon glass (B) respectively.

I claim:—

1. An instrument comprising an index glass (A), a horizon glass (B) by which a portion of light reflected by the index glass toward the horizon glass is reflected and forms an image in a field in the line of sight viewed by the user while another portion of the beam passes through or past the horizon glass (B), in combination with a fixed mirror F, placed in the line joining the middle of the index glass (A) and the middle of the horizon glass (B) and arranged to reflect the portion of the beam which passes through or past the horizon glass in the plane of the instrument, and a mirror (G) which places itself at a constant inclination to the horizon and is supported at the place where the line of sight intersects the central ray reflected by the mirror F, for the purposes set forth.

2. An instrument comprising an index glass (A), a horizon glass (B) by which a portion of light reflected by the index glass toward the horizon glass is reflected and forms an image in a field, in the line of sight viewed by the user, while another portion of the beam passes through or past the horizon glass (B), in combination with a fixed mirror F, placed in the line joining the middle of the index glass (A) and the middle of the horizon glass (B), and arranged to reflect the portion of the beam which passes through or past the horizon glass in the plane of the instrument, and an adjustable mirror having gravity means tending to hold it at a constant inclination to the horizon and supported at the place where the line of sight intersects the central ray reflected upward by the mirror F, for the purposes set forth.

In testimony whereof I affix my signature in the presence of two witnesses.

L. BECKER.

Witnesses:
J. ALFRED BREWER,
DORA E. BAILLIE.